United States Patent
Jeong

(10) Patent No.: US 9,035,818 B2
(45) Date of Patent: May 19, 2015

(54) DETECTION SENSOR

(75) Inventor: Seong Hee Jeong, Seoul (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 585 days.

(21) Appl. No.: 13/357,387

(22) Filed: Jan. 24, 2012

(65) Prior Publication Data

US 2012/0188117 A1 Jul. 26, 2012

(30) Foreign Application Priority Data

Jan. 25, 2011 (KR) .................. 10-2011-0007155

(51) Int. Cl.
| | | |
|---|---|---|
| *G01S 13/00* | (2006.01) | |
| *H01Q 21/06* | (2006.01) | |
| *H01Q 3/24* | (2006.01) | |
| *H01Q 25/00* | (2006.01) | |
| *G01S 13/04* | (2006.01) | |
| *G01S 13/56* | (2006.01) | |
| *G01S 13/02* | (2006.01) | |

(52) U.S. Cl.
CPC .............. *H01Q 21/065* (2013.01); *G01S 13/04* (2013.01); *G01S 13/56* (2013.01); *G01S 13/0209* (2013.01); *H01Q 3/24* (2013.01); *H01Q 25/002* (2013.01)

(58) Field of Classification Search
CPC ..... G01S 13/04; G01S 13/0209; G01S 13/56; H01Q 21/065; H01Q 3/24
USPC .......................................................... 342/27
See application file for complete search history.

(56) References Cited

U.S. PATENT DOCUMENTS

| 6,995,730 | B2 * | 2/2006 | Pleva et al. .................. 343/876 |
| 7,268,722 | B2 * | 9/2007 | Gottwald et al. ............. 342/70 |
| 2003/0164791 | A1 * | 9/2003 | Shinoda et al. ............... 342/70 |
| 2008/0258964 | A1 * | 10/2008 | Schoeberl et al. ........... 342/189 |

FOREIGN PATENT DOCUMENTS

| DE | 102 61 027 A1 | 7/2004 |
| JP | 2003-248055 A | 9/2003 |
| WO | 2004061475 A1 | 7/2004 |
| WO | 2006063915 A1 | 6/2006 |

OTHER PUBLICATIONS

Chinese Office Action, w/ English translation thereof, issued in Chinese Patent Application No. CN 201210051971.X dated Sep. 11, 2013.
German Office Action, w/ English translation thereof, issued in German Patent Application No. DE 10 2012 001 069.9 dated Apr. 9, 2013.
Korean Office Action issued in Korean Patent Application No. KR 10-2011-0007155 dated Feb. 17, 2012.

* cited by examiner

*Primary Examiner* — Frank J McGue

(74) *Attorney, Agent, or Firm* — McDermott Will & Emery LLP

(57) ABSTRACT

Disclosed is a detection sensor, which can detect various detection regions even with a small-sized antenna.

17 Claims, 9 Drawing Sheets

FIG.3
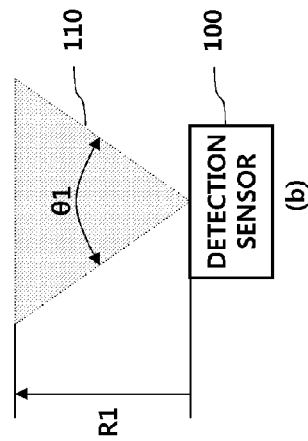
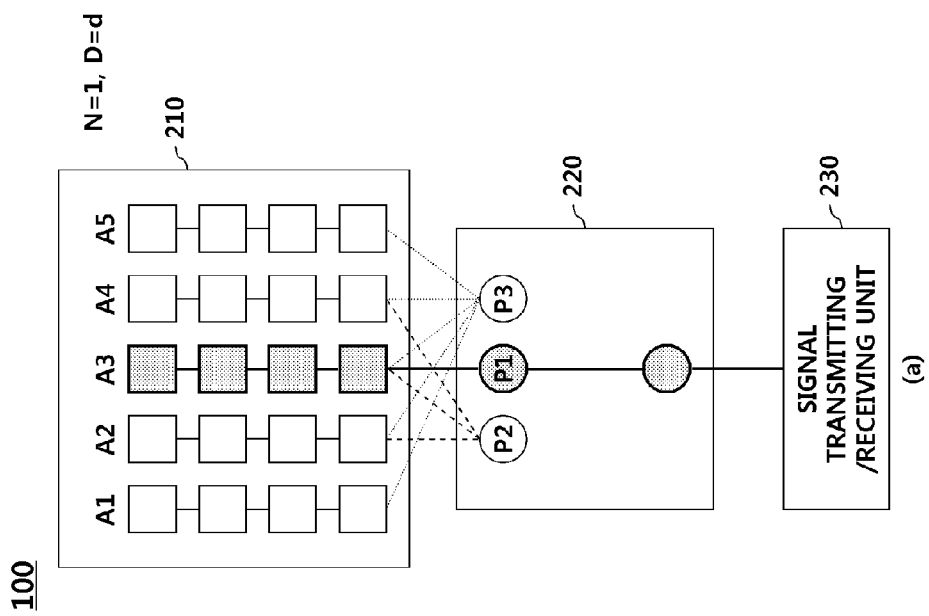

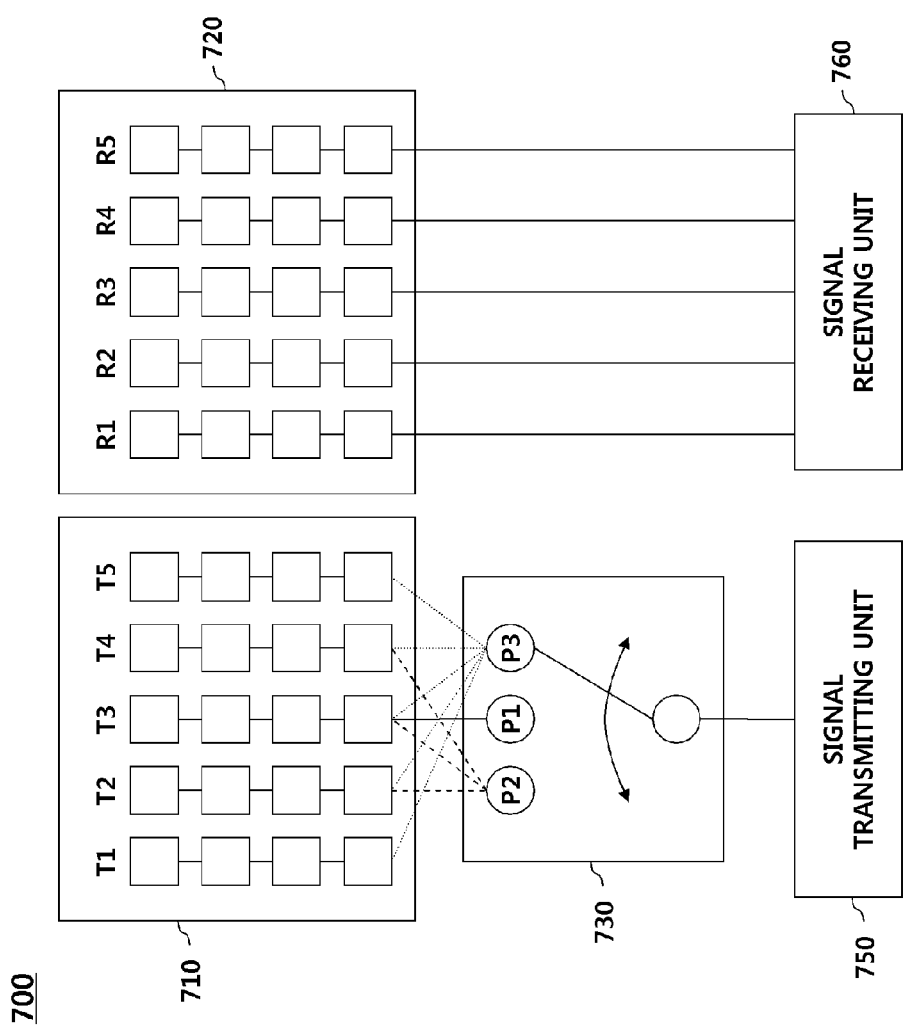

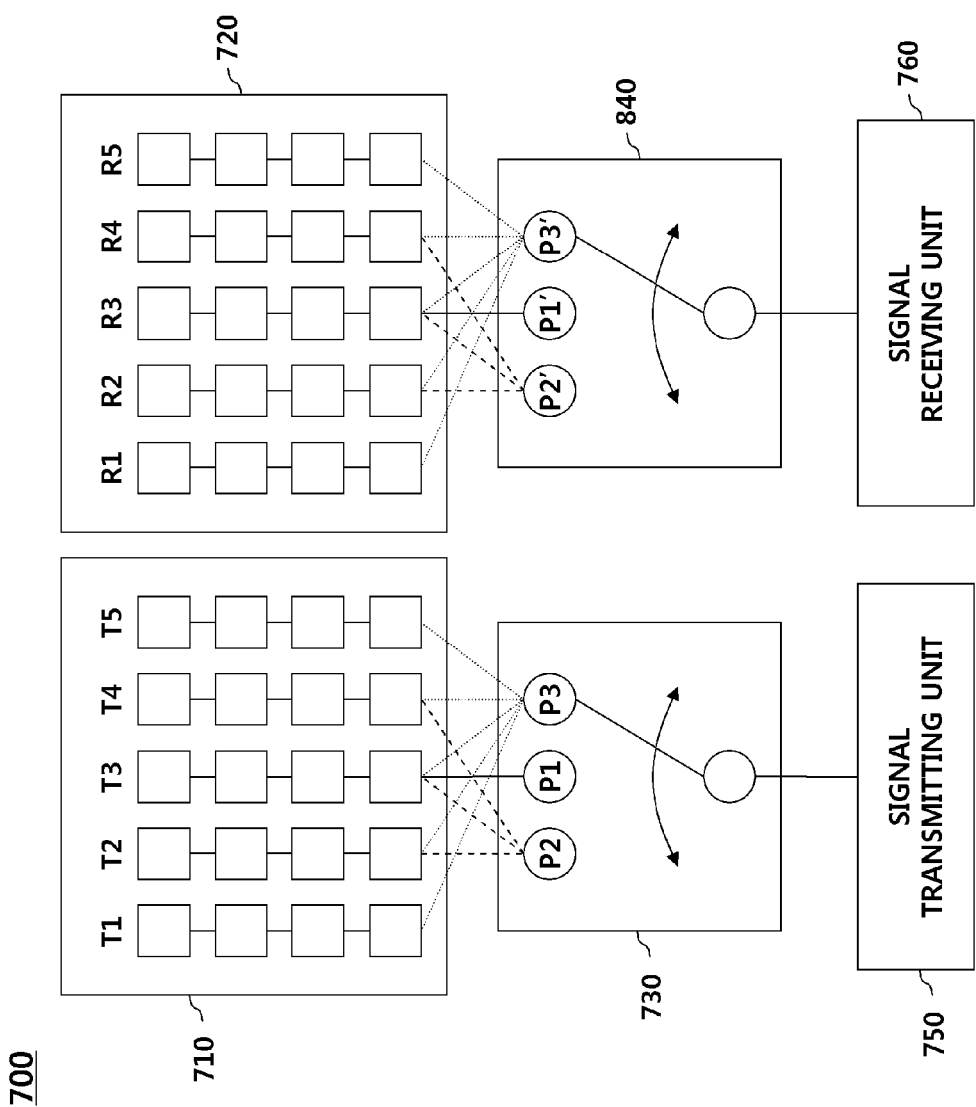

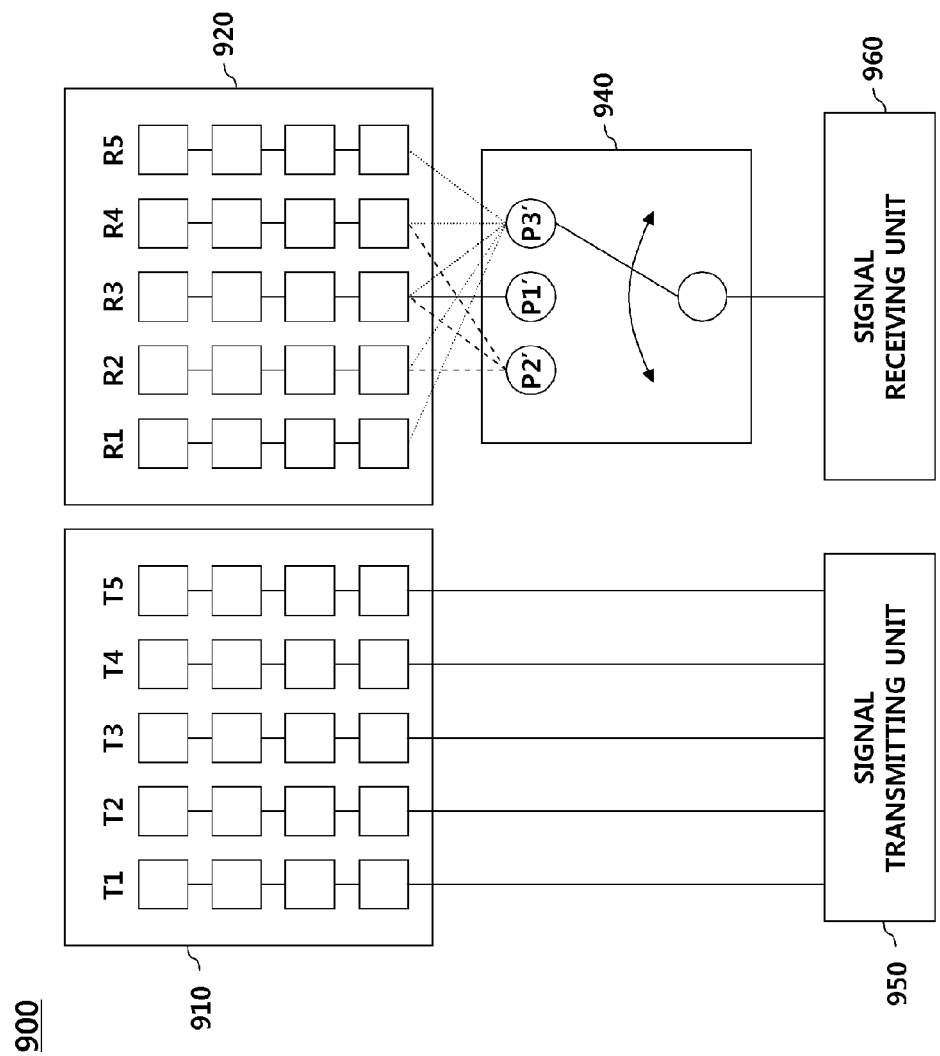

DETECTION SENSOR

CROSS-REFERENCE TO RELATED APPLICATION

This application claims a priority from and the benefit under 35 U.S.C. §119(a) of Korean Patent Application No. 10-2011-0007155, filed on Jan. 25, 2011, which is hereby incorporated by reference for all purposes as if fully set forth herein.

BACKGROUND OF THE INVENTION

1. Field of the invention

The present invention relates to a detection sensor, and more particularly to a detection sensor which can detect various detection regions even with a small-sized antenna.

2. Description of the Prior Art

Conventionally, separate detection sensors for various detection regions have been required to detect an object over various detection regions. That is, many high-priced detection sensors are necessary in order to detect various detection regions.

In order to solve this problem, an integrated type detection sensor including which a plurality of detection sensors for various detection regions integrated therein has been developed. However, since such an integrated type detection sensor includes a plurality of individual antenna elements for various detection regions, the overall size of the antenna elements is too large, which increases the overall size of the integrated type detection sensor and also increases the manufacturing costs.

SUMMARY OF THE INVENTION

Accordingly, the present invention has been made to solve the above-mentioned problems occurring in the prior art, and an aspect of the present invention is to provide a detection sensor which can detect various detection regions using only one antenna structure without employing separate antenna structures for various detection regions in order to detect the detection regions.

In order to accomplish this object, there is provided a detection sensor including: a signal transmitting antenna unit including a plurality of signal transmitting antennas; a signal receiving antenna unit including a plurality of signal receiving antennas; a signal transmitting switch for selecting a specific signal transmitting feed port for electric power feeding from a plurality of signal transmitting feed ports according to set detection region information; a signal transmitting unit for transmitting signals through one or more specific signal transmitting antennas connected to a specific signal transmitting feed port among the plurality of signal transmitting antennas; and a signal receiving unit for receiving signals reflected at the periphery among the transmitted signals through the plurality of signal receiving antennas, wherein the plurality of signal transmitting feed ports are connected to one or more signal transmitting antennas among the plurality of signal transmitting antennas respectively, and the numbers of the one or more connected signal transmitting antennas are different from each other.

In accordance with another aspect of the present invention, there is provided a detection sensor including: a signal transmitting antenna unit including a plurality of signal transmitting antennas; a signal receiving antenna unit including a plurality of signal receiving antennas; a switch for selecting a specific signal receiving feed port for electric power feeding from a plurality of signal receiving feed ports according to set detection region information; a signal transmitting unit for transmitting signals through the plurality of signal transmitting antennas; and a signal receiving unit for receiving signals reflected at the periphery among the transmitted signals through one or more signal receiving antennas connected to the specific signal receiving feed port, wherein the plurality of signal receiving feed ports are connected to one or more signal receiving antennas among the plurality of signal receiving antennas respectively, and the numbers of the one or more connected signal receiving antennas are different from each other.

In accordance with still another aspect of the present invention, there is provided a detection sensor including: an antenna unit including a plurality of antennas; a switch for selecting a specific feed port for electric power feeding from a plurality of feed ports according to set detection region information; and a signal transmitting/receiving unit for transmitting and receiving signals through one or more specific antennas connected to the specific feed port, wherein the plurality of feed ports are connected to one or more antennas among the plurality of antennas respectively and the numbers of the connected one ore more antennas are different from each other.

As mentioned above, according to the present invention, a detection sensor can detect various detection regions using only one antenna structure without requiring separate antenna structures for various detection regions in order to detect the detect regions.

Accordingly, an overall size of the antenna structure can be reduced and thus a size of the detection sensor can become smaller, and manufacturing costs can be reduced.

BRIEF DESCRIPTION OF THE DRAWINGS

The above and other objects, features and advantages of the present invention will be more apparent from the following detailed description taken in conjunction with the accompanying drawings, in which:

FIG. 3 illustrates an example of a first detection of the detection sensor according to the embodiment of the present invention, and illustrates the detection sensor where a switch switches a first feed port for electric power feeding, and a first detection region in the state;

FIG. 7 is a view illustrating a detection sensor according to another embodiment of the present invention;

FIG. 8 is a view illustrating a detection sensor according to still another embodiment of the present invention; and FIG. 9 is a view illustrating a detection sensor according to yet another embodiment of the present invention.

DETAILED DESCRIPTION OF THE PREFERRED EMBODIMENTS

Figure 1:
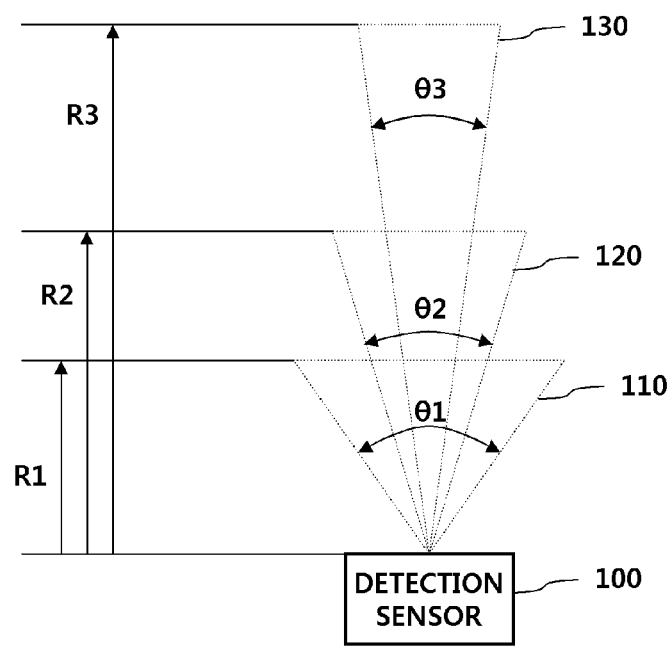
FIG. 1 is a view for briefly explaining a detection sensor according to an embodiment of the present invention, wherein various detection regions detectable by the detection sensor are exemplified.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a view for briefly explaining a detection sensor 100 according to an embodiment of the present invention, wherein various detection regions detectable by the detection sensor 100 are exemplified.

The detection sensor 100 according to the embodiment of the present invention is adapted to detect various detection regions using one antenna structure without employing separate antenna structures for various detection regions in order to detect the detection regions.

FIG. 1 exemplifying such a detection sensor 100 illustrates that the detection sensor 100 can detect three detection regions including a first detection region 110, a second detection region 120, and a third detection region 130. FIG. 1 is simply an illustration for convenience' sake, but the detection sensor 100 may detect two detection regions or four or more detection regions. In FIG. 1, the first detection region 110, the second detection region 120, and the third detection region 130 are in the form of beams.

Referring to FIG. 1, the first detection region 110, the second detection region 120, and the third detection region 130 may be defined by different detection distances and detection angles. The first detection region 110 may be defined by a first detection distance (R1) and a first detection angle (Θ1), the second detection region 120 may be defined by a second detection distance (R2) and a second detection angle (Θ2), and the third detection region 130 may be defined by a third detection distance (R3) and a third detection angle (Θ3). As an example, the correlations of the detection distances and detection angles for the detection regions may be presented as follows.

Detection distances: R1<R2<R3
Detection angles: Θ1>Θ2>Θ3

Hereinafter, the detection sensor 100 according to the embodiment of the present invention which has been described briefly will be described in more detail with reference to several drawings. Meanwhile, for convenience' sake, the first detection region 110 will be referred to as a near detection region, the second detection region 120 will be referred to as a middle detection region, and the third detection region 130 will be referred to as a far detection region. The first detection distance R1 will be referred to as a near detection distance, the second detection distance R2 will be referred to as a middle detection distance, and the third detection distance R2 will be referred to as a far detection distance. The first detection angle Θ1 will be referred to as a near detection angle, the second detection angle Θ2 will be referred to as a middle detection angle, and the third detection angle Θ3 will be referred to as a far detection angle.

Figure 2:
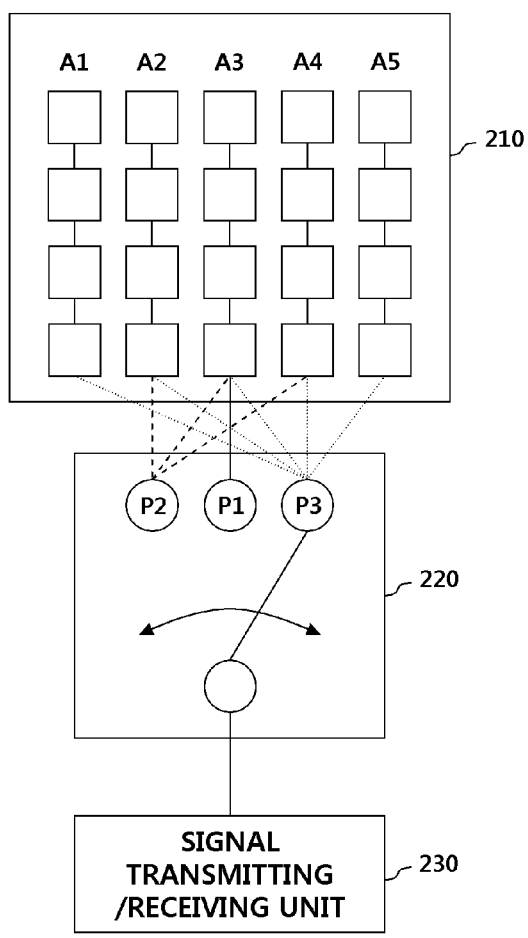
FIG. 2 is a view illustrating the detection sensor according to the embodiment of the present invention.

FIG. 2 is a view illustrating the detection sensor 100 according to the embodiment of the present invention.

Referring to FIG. 2, the detection sensor 100 according to the embodiment of the present invention includes an antenna unit 210 including a plurality of antennas A1, A2, A3, A4, and A5, a switch 220 for selecting a specific feed port for electric power feeding from a plurality of feed ports P1, P2, and P3 based on set detection region information, and a signal transmitting/receiving unit 230 for transmitting and receiving signals through one or more specific antennas connected to the specific feed port.

In order to allow the detection sensor 100 to detect various detection regions, the plurality of feed ports P1, P2, and P3 are connected to one or more antennas respectively, the numbers of the one or more antennas connected to the plurality of feed ports P1, P2, and P3 respectively should be different from each other. This allows the detection sensor 100 to detect various detection regions (three detection regions in FIG. 2) by using one antenna structure.

For example, referring to FIG. 2, the first feed port P1 is connected to Antenna A3, the second feed port P2 is connected to Antenna A2, Antenna A3, and Antenna A4, and the third feed port P3 is connected to Antenna A1, Antenna A2, Antenna A3, Antenna A4, and Antenna A5. That is, it can be seen that the number of the antennas connected to the first feed port P1 is one, the number of the antennas connected to the second feed port P3 is three, and the number of the antennas connected to the third feed port P3 is three, so they are different from each other.

As mentioned above, the switch 220 selects one specific feed port from the plurality of feed ports P1, P2, and P3 based on the set detection region information. Here, the set detection region information may include set values for more than one of detection distances and detection angles, or may include one of far detection region identifying information, middle detection region identifying information, and far detection region identifying information.

Hereinafter, a manner of the switch 220 selecting one specific feed port from the plurality of feed ports P1, P2, and P3 when the set detection region information includes set values for more than one of detection distances and detection angles will be described.

The set values for detection distances included in the set detection region information may be proportional to the numbers of the one or more specific antennas connected to the specific feed port selected by the switch 220, and the set values for detection angles may be inversely proportional to an interval of the one or more specific antennas connected to the specific feed port.

Referring to FIG. 2, when the specific feed port is the first feed port P1, the set value for the detection distance is proportional to one, i.e. the number of antennas. When the specific feed port is the second feed port P2, the set value for the detection distance is proportional to three, i.e. the number of antennas. When the specific feed port is the third feed port P3, the set value for the detection distance is proportional to five, i.e. the number of antennas.

Antenna number information for detection distances, antenna interval information for detection angles, or antenna number/interval information for angular resolutions, which are included in the detection region information, may be stored in the detection sensor 100 or a device connected to the detection sensor 100.

The above-mentioned switch 220 may identify set values for more than one of the detection distances and detection angles included in the set detection region information, may determine the number of the specific antennas determined according to the identified set values with reference to antenna number information for detection distances, antenna interval information for detection angles, or antenna number/interval information for angular resolutions, which is included in the detection region information, and may select a specific feed port connected to the specific antennas having a specific antenna interval from the plurality of feed ports by using the determined number of specific antennas.

In order to exemplarily explain the above-mentioned switching manner with reference to FIGS. 1 and 2, it is assumed in the antenna number information for detection distances stored in advance that the number of antennas is one when the detection distance is a first detection distance R1, the number of antennas is three when the detection distance is a second detection distance R2, and the number of antennas is five when the detection distance is a third detection distance R3.

As an example according to the assumption, when the set value for the detection distance is a first detection distance R1 after the set detection region information is identified at the time when the switch 220 performs a switching operation, the number of the specific antennas is determined to be one from the antenna number information for the detection distance stored in advance and a first feed port P1 connected to a specific antenna (Antenna A3) corresponding to one, i.e. the determined number of antennas is selected from the plurality of feed ports P1, P2, and P3.

As another example according to the assumption, when the set value for the detection distance is a second detection distance R2 after the set detection region information is identified at the time when the switch 220 performs a switching operation, the number of the specific antennas is determined to be three from the antenna number information for the detection distance stored in advance and a second feed port P2 connected to specific antennas (Antenna A2, Antenna A3, and Antenna A4) corresponding to three, i.e. the determined number of antennas is selected from the plurality of feed ports P1, P2, and P3.

As another example according to the assumption, when the set value for the detection distance is a third detection distance R3 after the set detection region information is identified at the time when the switch 220 performs a switching operation, the number of the specific antennas is determined to be five from the antenna number information for the detection distance stored in advance and a third feed port P3 connected to specific antennas (Antenna A1, Antenna A2, Antenna A3, Antenna A4, and Antenna A5) corresponding to five, i.e. the determined number of antennas is selected from the plurality of feed ports P1, P2, and P3.

The detection sensor 100 according to the embodiment of the present invention may have an angular resolution which is inversely proportional to a value obtained by multiplying the number of one or more specific antennas connected to a specific feed port by an interval of the specific antennas.

Hereinafter, a manner of the switch 220 selecting one specific feed port from the plurality of feed ports P1, P2, and P3 when the set detection region information includes one of far detection region identifying information, middle detection region identifying information, and near detection region identifying information will be described.

When the set detection region information includes near detection region identifying information, the switch 220 selects the first feed port P1 connected to a specific feed port (one antenna (Antenna A3) in FIG. 2) connected to the fewest antennas among the plurality of feed ports P1, P2, and P3. When the detection region information includes middle detection region identifying information, the switch 220 selects the second feed port P2 connected to a specific feed port (three antennas (Antenna A2, Antenna A3, and Antenna A4 in FIG. 2) connected to the second fewest antennas among the plurality of feed ports P1, P2, and P3. When the detection region information includes far detection region identifying information, the switch 220 selects the third feed port P3 connected to a specific feed port (five antennas (Antenna A1, Antenna A2, Antenna A3, Antenna A4, and Antenna A5 in FIG. 2) connected to the most antennas among the plurality of feed ports P1, P2, and P3.

The above-mentioned near detection region identifying information is defined by the near detection distance R1 and the near detection angle $\Theta$1, the middle detection region identifying information is defined by the near detection distance R2 and the near detection angle $\Theta$2, and the far detection region identifying information is defined by the far detection distance R3 and the far detection angle $\Theta$3.

The far detection distance R3 is the longest and the near detection distance R1 is the shortest (i.e. R1<R2<R3). The far detection angle $\Theta$3 is the narrowest and the near detection angle $\Theta$1 is the widest (i.e. $\Theta$1>$\Theta$2>$\Theta$3).

According to the above-mentioned switching manner, a specific feed port (one of P1, P2, and P3) is selected by the switch 220 so that electric power is supplied to the selected specific feed port. Thereafter, the signal transmitting/receiving unit 230 transmits and receives signals through one or more antennas connected to the specific feed port.

FIG. 3 illustrates an example of a first detection of the detection sensor 100 according to the embodiment of the present invention, wherein FIG. 3A illustrates the detection sensor 100 where a switch 220 switches a first feed port P1 for electric power feeding according to detection region information (including R1 and $\Theta$1, or including near detection region identifying information (including first detection region identifying information) defined by R1 and $\Theta$1) and FIG. 3B illustrates a first detection region 110 in the state.

Then, the antenna transmitting and receiving signals is Antenna A3, the number N of the antennas is one, and an interval D of the antenna is d (N=1, D=d).

Figure 4:
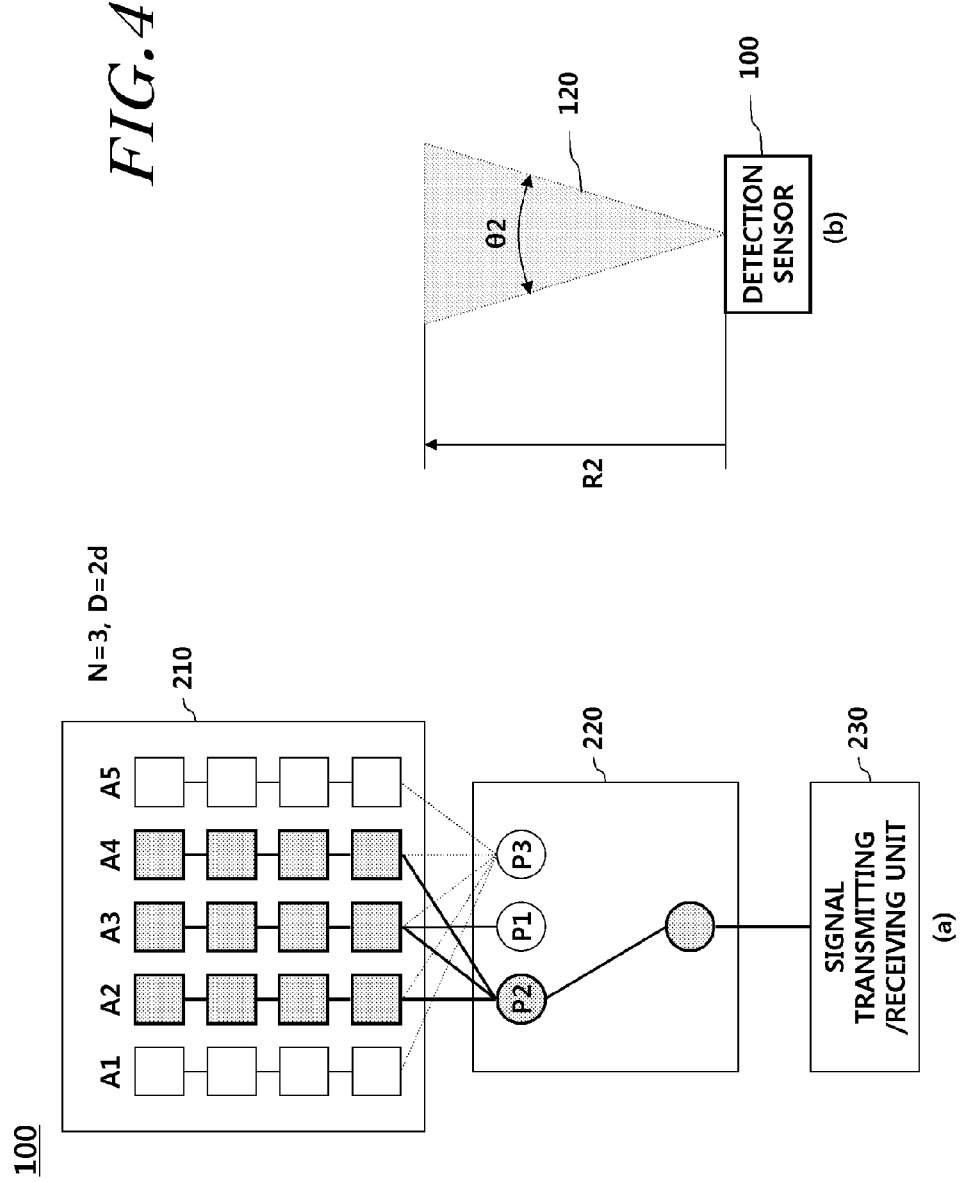
FIG. 4 illustrates an example of a second detection of the detection sensor according to the embodiment of the present invention, and illustrates the detection sensor where a switch switches a second feed port for electric power feeding, and a second detection region in the state.

FIG. 4 illustrates an example of a second detection of the detection sensor 100 according to the embodiment of the present invention, wherein FIG. 4A illustrates the detection sensor 100 where a switch 220 switches a second feed port P2 for electric power feeding according to detection region information (including R2 and $\Theta$2, or including middle detection region identifying information (including second detection region identifying information) defined by R2 and $\Theta$2) and FIG. 4B illustrates a second detection region 120 in the state.

Then, the antennas transmitting and receiving signals are Antenna A2, Antenna A3, and Antenna A4, the number N of the antennas is three, and an interval D of the antennas is a value obtained by multiplying a basic antenna interval d by 2 (N=1, D=2d).

Figure 5:
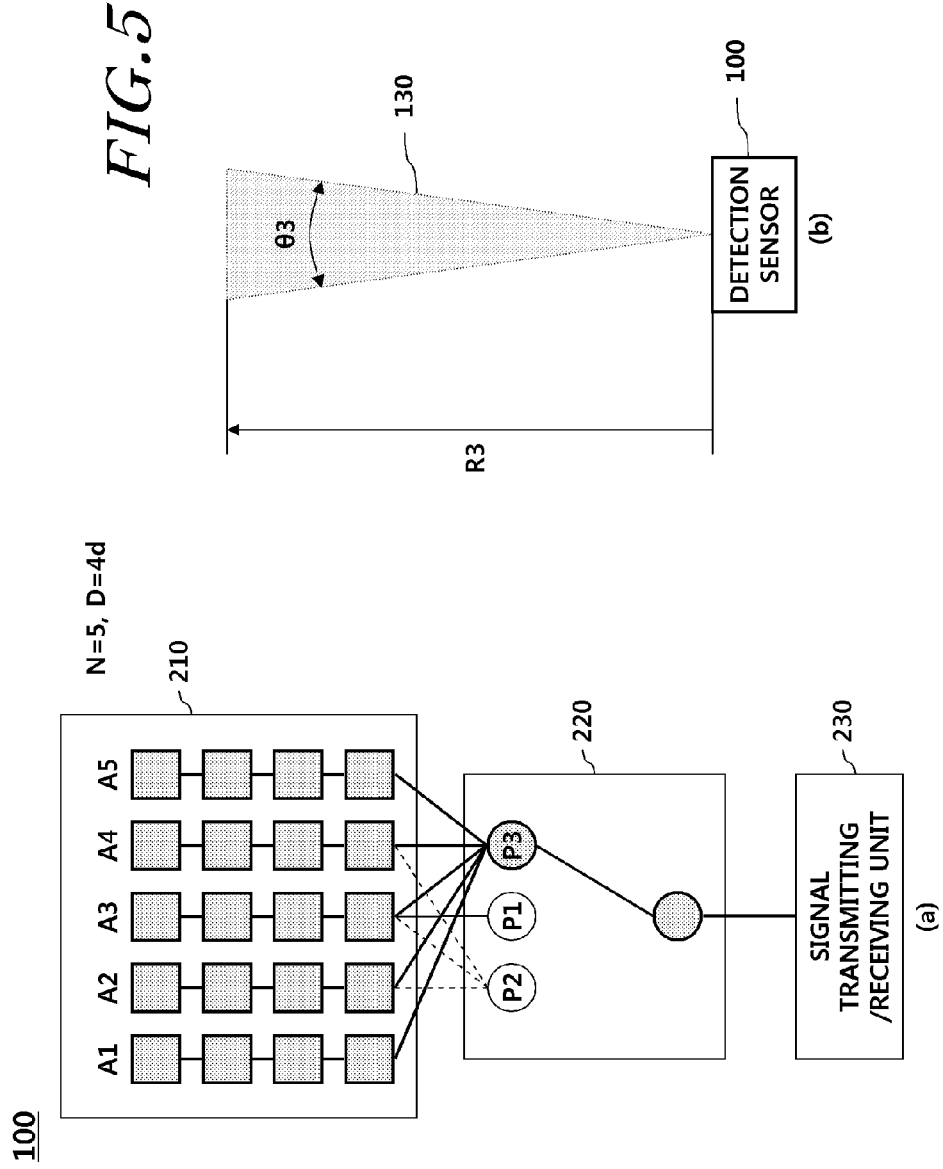
FIG. 5 illustrates an example of a third detection of the detection sensor according to the embodiment of the present invention, and illustrates the detection sensor where a switch switches a third feed port for electric power feeding, and a third detection region in the state.

FIG. 5 illustrates an example of a third detection of the detection sensor 100 according to the embodiment of the present invention, wherein FIG. 5A illustrates the detection sensor 100 where a switch 220 switches a third feed port P3 for electric power feeding according to detection region information (including R3 and Θ3, or including far detection region identifying information (including third detection region identifying information) defined by R3 and Θ3) and FIG. 5B illustrates a third detection region 120 in the state.

Then, the antennas transmitting and receiving signals are Antenna A1, Antenna A2, Antenna A3, Antenna A4, and Antenna A5, the number N of the antennas is five, and an interval D of the antennas is a value obtained by multiplying a basic antenna interval d by 4 (N=1, D=4d).

How a detection distance R and a detection angle Θ can be varied according to the structural features of the antennas (the number N of the antennas and the interval D of the antennas for a specific antennas connected to the switched specific feed port) will be described in more detail with reference to FIG. 6.

Figure 6:
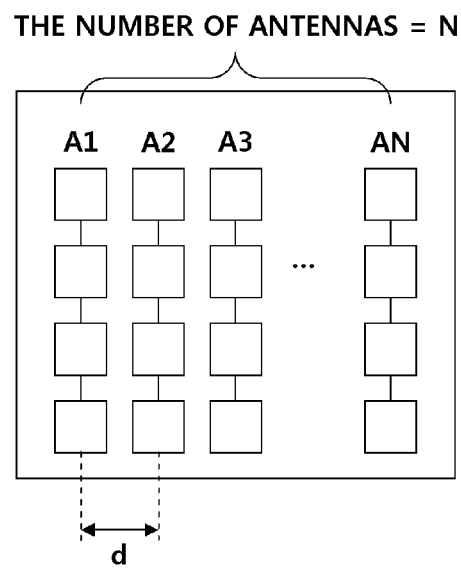
FIG. 6 is a view where a structure of an antenna of the detection sensor according to the embodiment of the present invention is generalized to be exemplified.

FIG. 6 illustrates a view where a structure of an antenna of the detection sensor according to the embodiment of the present invention is generalized to be exemplified, in order to describe how a detection distance R and a detection angle Θ can be varied according to the structural features of the antennas (the number N of the antennas and the interval D of the antennas for a specific antennas connected to the switched specific feed port).

In the structure of the antenna unit 210 illustrated in FIG. 6, N (the number of antennas) antennas (A1, A2, ..., AN) are separated from each other by d (the basic interval of the antennas). Meanwhile, it is assumed that all the N (the number of antennas) antennas (A1, A2, ..., AN) are connected to one feed port such that electric power is fed.

A detection distance R and a detection angle Θ in the antenna structure of FIG. 6 will be described.

First, a detection distance R in the antenna structure will be described.

A detection distance R is proportional to an antenna gain G and can be expressed as in Equation 1. Here, an antenna gain is a total antenna gain for N antennas and can be expressed as in Equation 2.

$$R = \left( \frac{P_t G^2 \lambda^2 \sigma}{(4\pi)^3 S_{min}} \right)^{1/4} \quad \text{Equation 1}$$

$$G = T + 10 * \log N \ (dBi) \quad \text{Equation 2}$$

When a relation between a detection distance R and the number N of antennas is deducted by substituting Equation 1 by Equation 2, R is proportional to $(\log N)^{1/2}$. That is, it can be seen that R is proportional to N.

Thus, a detection distance R can be varied by adjusting the number N of antennas. That is, in order to obtain a desired specific detection distance, the switch 120 may select a specific feed port where the number of the connected antennas is the number of specific antennas defined by a specific detection distance to be obtained.

Next, a detection angle Θ in the antenna structure will be described.

A detection angle Θ is inversely proportional to an interval D of antennas and can be expressed as in Equation 3. Here, an interval D of antennas is a value obtained by multiplying an interval between two antennas, i.e. a basic interval d of antennas by the number of intervals. That is, in FIG. 6, an interval D of antennas is (N-1)*d.

$$\theta \propto \frac{1}{D} \quad \text{Equation 3}$$

Through Equation 3, a detection angle Θ can be varied by adjusting an interval D of antennas. That is, in order to obtain a desired specific detection angle, the switch 120 selects a specific feed port connected to the antennas arranged at a specific interval of antennas.

Meanwhile, the detection sensor 100 may have an angular resolution which is inversely proportional to the number N of antennas and an interval D of antennas. The angular resolution may be expressed as in Equation 4.

$$\text{ANGULAR RESOLUTION} \propto \frac{1}{N \times D} \quad \text{Equation 4}$$

Meanwhile, the plurality of antennas A1 to A5 which have been mentioned above may be array antennas respectively.

The detection sensor 100 according to the embodiment of the present invention may be a radar device which can be mounted to a vehicle, etc.

Hereinafter, detection sensors according to other embodiments of the present invention which can detect various detection regions using only one antenna structure without employing separate antenna structures for detection regions to detect various detection regions will be described with reference to FIGS. 7, 8, and 9.

Referring to FIG. 7, the detection sensor 700 according to the another embodiment of the present invention includes a signal transmitting antenna unit 710 including a plurality of signal transmitting antennas T1, T2, T3, T4, and T5, a signal receiving antenna unit 720 including a plurality of signal receiving antennas RI, R2, R3, R4, and R5, a signal transmitting switch 730 for selecting a specific signal transmitting feed port (one of P1, P2, and P3) for electric power feeding from a plurality of signal transmitting feed ports P1, P2, and P3 according to set detection region information, a signal transmitting unit 750 for transmitting signals through one or more specific signal transmitting antennas connected to a specific signal transmitting feed port among the plurality of signal transmitting antennas T1, T2, T3, T4, and T5, and a signal receiving unit 760 for receiving signals reflected at the periphery among the transmitted signals through the plurality of signal receiving antennas R1, R2, R3, R4, and R5.

The plurality of signal transmitting feed ports P1, P2, and P3 which have been mentioned above are connected to one or more signal transmitting antennas among the plurality of signal transmitting antennas T1, T2, T3, T4, and T5 respectively, and the numbers of the one or more connected signal transmitting antennas are different from each other. Through this, signals having beam patterns for detecting three different detection regions may be transmitted.

The set detection region information which has been mentioned above may include set values for one or more of a detection distance R and a detection angle Θ, or may include one of far detection region identifying information, middle detection region identifying information, and near detection region identifying information.

Hereinafter, a manner of the signal transmitting switch 730 selecting one specific feed port among the plurality of feed ports P1, P2, and P3 when the set detection region information includes set values for one or more of a detection distance and a detection angle will be described.

The set value for a detection distance R included in the set detection region information is proportional to the number of the one or more specific signal transmitting antennas connected to the switched specific signal transmitting feed port and the set value for a detection angle Θ is inversely proportional to an interval D of the one or more specific signal transmitting antennas connected to the switched specific signal transmitting feed port.

An angular resolution may be determined according to a structural feature of antennas related to the detection distance R and the detection angle Θ, i.e. according to the number N of signal transmitting antennas and an interval D of the signal transmitting antennas. The angular resolution is inversely proportional to a value obtained by multiplying the number N of the one or more specific signal transmitting antennas connected to a specific signal transmitting feed port by an interval D of signal transmitting antennas.

Referring to FIG. 7, when the specific signal transmitting feed port is the first signal transmitting feed port P1, the set value for the detection distance is proportional to one, i.e. the number of signal transmitting antennas T3 connected to the first signal transmitting feed port P1. When the specific feed port is the second signal transmitting feed port P2, the set value for the detection distance is proportional to three, i.e. the number of signal transmitting antennas T2, T3, and T4 connected to the second signal transmitting feed port P2. When the specific feed port is the third signal transmitting feed port P3, the set value for the detection distance is proportional to five, i.e. the number of signal transmitting antennas T1, T2, T3, T4, and T5 connected to the third signal transmitting feed port P3.

Antenna number information for detection distances, antenna interval information for detection angles, or antenna number/interval information for angular resolutions, which is included in the detection region information, may be stored in the detection sensor 700 or a device connected to the detection sensor 700.

By referring to the information and using a relation between a detection distance R and an antenna structure (i.e. the number N of signal transmitting antennas) and a relation between a detection angle Θ and an antenna structure (i.e. an interval D of signal transmitting antennas), the signal transmitting switch 730 may select a specific signal transmitting feed port to which specific signal transmitting antennas whose number is determined by the set values for one or more of the detection distance and the detection angle are connected such that they are spaced apart from each other from the plurality of signal transmitting feed ports P1, P2, and P3.

In order to exemplarily explain the above-mentioned switching method with reference to FIG. 7, it is assumed that the number of signal transmitting antennas is set to one when a detection distance is a first detection distance R1, the number of signal transmitting antennas is set to three when a detection distance is a second detection distance R2, the number of signal transmitting antennas is set to five when a detection distance is a third detection distance R3 in the signal transmitting antenna number information for detection distances which has been stored in advance.

As an example according to the assumption, when the set value for the detection distance is a first detection distance R1 after the set detection region information is identified at the time when the switch 730 performs a switching operation, the number of the specific signal transmitting antennas is determined to be one from the antenna number information for the detection distance stored in advance and a first signal transmitting feed port P1 connected to a specific signal transmitting antenna (T3) corresponding to one, i.e. the determined number of signal transmitting antennas is selected from the plurality of signal transmitting feed ports P1, P2, and P3.

As another example according to the assumption, when the set value for the detection distance is a second detection distance R2 after the set detection region information is identified at the time when the switch 730 performs a switching operation, the number of the specific signal transmitting antennas is determined to be three from the antenna number information for the detection distance stored in advance and a second signal transmitting feed port P2 connected to specific signal transmitting antennas (T3, T4, and T5) corresponding to three, i.e. the determined number of signal transmitting antennas is selected from the plurality of signal transmitting feed ports P1, P2, and P3.

As another example according to the assumption, when the set value for the detection distance is a second detection distance R3 after the set detection region information is identified at the time when the switch 730 performs a switching operation, the number of the specific signal transmitting antennas is determined to be five from the antenna number information for the detection distance stored in advance and a third signal transmitting feed port P3 connected to specific signal transmitting antennas (T1, T2, T3, T4, and T5) corresponding to five, i.e. the determined number of signal transmitting antennas is selected from the plurality of signal transmitting feed ports P1, P2, and P3.

Hereinafter, a manner of the signal transmitting switch 730 selecting one specific feed port among the plurality of feed ports P1, P2, and P3 when the set detection region information includes far detection region identifying information, middle detection region identifying information, and near detection region identifying information will be described.

When the set detection region information includes near detection region identifying information, the signal transmitting switch 730 selects the specific feed port P1 connected to the fewest antennas among the plurality of feed ports P1, P2, and P3.

When the set detection region information includes middle detection region identifying information, the signal transmitting switch 730 selects the specific feed port P2 connected to the second fewest antennas among the plurality of feed ports P1, P2, and P3.

When the set detection region information includes near detection region identifying information, the signal transmitting switch 730 selects the specific feed port P3 connected to the most antennas among the plurality of feed ports P1, P2, and P3.

Meanwhile, as illustrated in FIG. 8, the detection sensor 700 according to another embodiment of the present invention may further include a signal receiving switch 840 for selecting a specific signal receiving feed port for electric power feeding among the plurality of signal receiving feed ports P1', P2', and P3' according to set detection region information.

In this case, the above-mentioned signal receiving unit 860 may receive signals reflected at the periphery among the signals transmitted from the signal transmitting antenna unit 710 through one or more specific signal receiving antennas connected to the specific signal receiving feed ports P1', P2', and P3'.

Then, the plurality of signal receiving feed ports P1', P2', and P3' are connected to one or more signal receiving antennas among the plurality of signal receiving antennas R1, R2, R3, R4, and R5 respectively, and the number of the connected signal receiving antennas are different from each other. This allows the detection sensor 700 to detect a specific detection region better, i.e. to receive signals reflected at the periphery among the signals transmitted from the signal transmitting antenna unit 710 better according to a switching operation of the signal transmitting switch 730 in order to enhance detection performance.

When the signal transmitting switch 730 and the signal receiving switch 840 are included at signal transmitting and receiving sides, a relation between a detection distance R and a structural feature of antennas (a structural feature of a signal transmitting antenna and a structural feature of a signal receiving antenna) and a relation between a detection angle Θ and a structural feature of antennas (a structural feature of a signal transmitting antenna and a structural feature of a signal receiving antenna) will be described again.

The set value for a detection distance R is proportional to a value obtained by multiplying the number of one or more signal transmitting antennas connected to the specific signal transmitting feed ports P1, P2, and P3 by the number of one or more specific signal receiving antennas connected to the specific signal receiving feed ports P1', P2', and P3'.

The set value for a detection angle Θ is proportional to the smaller one of an inverse number of an interval of the one or more specific signal transmitting antennas connected to the specific signal transmitting feed ports P1, P2, and P3 and an inverse number of an interval of the one or more specific signal receiving antennas connected to the specific signal receiving feed ports P1', P2', and P3'. That is, it means that the set value for a detection angle Θ is the smaller angle of a detection angle determined by a signal transmitting antenna structure and a detection angle determined by a signal receiving antenna structure.

The number of the one or more specific signal transmitting antennas connected to the specific signal transmitting feed ports and the number of the one or more specific signal receiving antennas connected to the specific signal receiving feed ports may be made the same. That is, the number of transmitting antennas transmitting signals for determining a detection region may become the same as the number of signal receiving antennas receiving the reflected signals.

Meanwhile, the plurality of signal transmitting antennas T1 to T5 and the plurality of signal receiving antennas R1 to R5 which have been mentioned above may be array antennas.

The detection sensor 700 according to the embodiment of the present invention may be a radar device which can be mounted to a vehicle, etc.

FIG. 9 is a view illustrating a detection sensor 900 according to another embodiment of the present invention.

Referring to FIG. 9, the detection sensor 900 according to the another embodiment of the present invention includes a signal transmitting antenna unit 910 including a plurality of signal transmitting antennas T1 to T5, a signal receiving antenna unit 920 including a plurality of signal receiving antennas R1 to R5, a switch 940 for selecting a specific signal receiving feed port for electric power feeding from a plurality of signal receiving feed ports P1', P2', and P3' according to set detection region information, a signal transmitting unit 950 for transmitting signals through the plurality of signal transmitting antennas T1 to T5, and a signal receiving unit 960 for receiving signals reflected at the periphery among the transmitted signals through one or more signal receiving antennas connected to the specific signal receiving feed port.

The plurality of signal receiving feed ports P1', P2', and P3' which have been mentioned above are connected to one or more signal receiving antennas among the plurality of signal receiving antennas, and the numbers of the one or more connected signal receiving antennas may be different from each other.

As mentioned above, according to the present invention, a detection sensor 100, 700, or 900 can detect various detection regions using only one antenna structure without requiring separate antenna structures for various detection regions in order to detect the detect regions.

Accordingly, an overall size of the antenna structure can be reduced and thus a size of the detection sensor 100, 700, or 900 can become smaller, and manufacturing costs can be reduced.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although exemplary embodiments of the present invention have been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A detection sensor comprising:
    a signal transmitting antenna unit including a plurality of signal transmitting antennas;
    a signal receiving antenna unit including a plurality of signal receiving antennas;
    a signal transmitting switch for selecting a specific signal transmitting feed port for electric power feeding from a plurality of signal transmitting feed ports according to set detection region information;

a signal transmitting unit for transmitting signals through one or ore specific signal transmitting antennas connected to the specific signal transmitting feed port among the plurality of signal transmitting antennas; and a signal receiving unit for receiving signals reflected at the periphery among the transmitted signals through the plurality of signal receiving antennas, wherein each of the plurality of signal transmitting feed ports is configured to be connected selectively to one or more signal transmitting antennas among the plurality of signal transmitting antennas respectively, and the numbers of the one or more connected signal transmitting antennas are different from each other, and at least one of the plurality of signal transmitting antennas is connected to at least two of the plurality of signal transmitting feed ports.

2. The detection sensor as claimed in claim 1, wherein the set detection region information includes set values for more than one of detection distances and detection angles, or includes one of far detection region identifying information, middle detection region identifying information, and far detection region identifying information.

3. The detection sensor as claimed in claim 2, wherein the set values for detection distances are proportional to the numbers of the one or more specific antennas connected to the specific feed port, and the set values for detection angles are inversely proportional to an interval of the one or more specific antennas connected to the specific feed port.

4. The detection sensor as claimed in claim 3, wherein the detection sensor has an angular resolution which is inversely proportional to a value obtained by multiplying the number of one or more specific antennas connected to a specific feed port by an interval of the specific antennas.

5. The detection sensor as claimed in claim 2, wherein when the set detection region information includes near detection region identifying information, the switch selects the specific signal transmitting feed port connected to the fewest signal transmitting antennas among the plurality of signal transmitting feed ports, and when the set detection region information includes far detection region identifying information, the switch selects the specific signal transmitting feed port connected to the most signal transmitting antennas among the plurality of signal transmitting feed ports.

6. The detection sensor as claimed in claim 2, further comprising a signal receiving switch for selecting a specific signal receiving feed port for electric power feeding among a plurality of signal receiving feed ports according to the set detection region information, wherein the signal receiving unit received the reflected signals through the one or more signal receiving antennas connected to the specific signal receiving feed port, and wherein the plurality of signal receiving feed ports are connected to the one or more signal receiving antennas among the plurality of signal receiving antennas respectively and the numbers of the connected signal receiving antennas are different from each other.

7. The detection sensor as claimed in claim 6, wherein the set value for a detection distance is proportional to a value obtained by multiplying the number of one or more signal transmitting antennas connected to the specific signal transmitting feed ports by the number of one or more specific signal receiving antennas connected to the specific signal receiving feed ports, and the set value for a detection angle is proportional to the smaller one of an inverse number of an interval of the one or more specific signal transmitting antennas connected to the specific signal transmitting feed ports and an inverse number of an interval of the one or more specific signal receiving antennas connected to the specific signal receiving feed ports.

8. The detection sensor as claimed in claim 6, wherein the number of the one or more specific signal transmitting antennas connected to the specific signal transmitting feed ports and the number of the one or more specific signal receiving antennas connected to the specific signal receiving feed ports are the same.

9. The detection sensor as claimed in claim 1, wherein the plurality of signal transmitting antennas and the plurality of signal receiving antennas are array antennas respectively.

10. The detection sensor as claimed in claim 1, wherein the detection sensor is a radar apparatus.

11. A detection sensor comprising:
a signal transmitting antenna unit including a plurality of signal transmitting antennas;
a signal receiving antenna unit including a plurality of signal receiving antennas;
a switch for selecting a specific signal receiving feed port for electric power feeding from a plurality of signal receiving feed ports according to set detection region information;
a signal transmitting unit for transmitting signals through the plurality of signal transmitting antennas; and
a signal receiving unit for receiving signals reflected at the periphery among the transmitted signals through one or more signal receiving antennas connected to the specific signal receiving feed port,
wherein each of the plurality of signal receiving feed ports is configured to be connected selectively to one or more signal receiving antennas among the plurality of signal receiving antennas respectively, and the numbers of the one or more connected signal receiving antennas are different from each other, and
at least one of the plurality of signal receiving antennas is connected to at least two of the plurality of signal receiving feed ports.

12. A detection sensor comprising:
an antenna unit including a plurality of antennas;
a switch for selecting a specific feed port for electric power feeding from a plurality of feed ports according to set detection region information; and
a signal transmitting/receiving unit for transmitting and receiving signals through one or more specific antennas connected to the specific feed port,
wherein each of the plurality of feed ports is configured to be connected selectively to one or more antennas among the plurality of antennas respectively and the numbers of the connected one or more antennas are different from each other, and
at least one of the plurality of antennas is connected to at least two of the plurality of feed ports.

13. The detection sensor as claimed in claim 12, wherein the set detection region information includes set values for more than one of detection distances and detection angles, or includes one of far detection region identifying information, middle detection region identifying information, and far detection region identifying information.

14. The detection sensor as claimed in claim 13, wherein the set values for detection distances are proportional to the numbers of the one or more specific antennas connected to the specific feed port, and the set values for detection angles are inversely proportional to an interval of the one or more specific antennas connected to the specific feed port.

15. The detection sensor as claimed in claim 14, wherein the detection sensor has an angular resolution which is inversely proportional to a value obtained by multiplying the number of one or more specific antennas connected to a specific feed port by an interval of the specific antennas.

16. The detection sensor as claimed in claim 13, wherein when the set detection region information includes near detection region identifying information, the switch selects the specific feed port connected to the fewest antennas among the plurality of signal transmitting feed ports, and when the set detection region information includes far detection region identifying information, the switch selects the specific feed port connected to the most antennas among the plurality of signal transmitting feed ports.

17. The detection sensor as claimed in claim 12, wherein the near detection region identifying information is defined by the near detection distance and the near detection angle, the middle detection region identifying information is defined by the middle detection distance and the middle detection angle, and the far detection region identifying information is defined by the far detection distance and the far detection angle, and wherein the far detection distance is the longest and the near detection distance R1 is the shortest and the far detection angle is the narrowest and the near detection angle is the widest.

\* \* \* \* \*